(12) United States Patent
Gruber et al.

(10) Patent No.: US 9,450,782 B2
(45) Date of Patent: Sep. 20, 2016

(54) METHOD FOR ESTABLISHING A COMMUNICATION CONNECTION AND COMMUNICATION DEVICE

(75) Inventors: Roland Gruber, Sauerlach (DE); Karl Heinz Rathgeb, Mering (DE); Holger Schmidt, Paderborn (DE); Frank Kowalewski, Unterhaching (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 1858 days.

(21) Appl. No.: 11/867,844

(22) Filed: Oct. 5, 2007

(65) Prior Publication Data
US 2009/0092127 A1 Apr. 9, 2009

(51) Int. Cl.
*H04L 12/66* (2006.01)
*H04L 12/64* (2006.01)

(52) U.S. Cl.
CPC .................... *H04L 12/64* (2013.01)

(58) Field of Classification Search
CPC ....................................... H04L 12/64
See application file for complete search history.

(56) References Cited

U.S. PATENT DOCUMENTS

| | | | |
|---|---|---|---|
| 4,958,153 A * | 9/1990 | Murata | H04M 1/253 370/462 |
| 2002/0082029 A1* | 6/2002 | Ahmad et al. | 455/458 |
| 2006/0045069 A1* | 3/2006 | Zehavi | H04L 12/5692 370/352 |
| 2008/0075067 A1* | 3/2008 | Guglielmi et al. | 370/352 |
| 2008/0287104 A1* | 11/2008 | Sundberg et al. | 455/412.1 |

OTHER PUBLICATIONS

3GPP TS 24.279 V7.5.0 (Jun. 2007); Technincal Specification, 3rd Generation Partnership Project; Technical Specification Group Core Network and Terminals; Combining Circuit Switched (CS) and IP Multimedia Subsystem (IMS) services; Stage 3 (Release 7).*
3GPP TS 24.279 V7.5.0 (Jun. 2007); Technical Specification, 3rd Generation Partnership Project; Technical Specification Group Core Network and Terminals; Combining Circuit Switched (CS) and IP Multimedia Subsystem (IMS) Services; Stage 3 (Release 7).*
3GPP TS 22.279 V7.1.0 (Dec. 2005); Technical Specification; 3rd Generation Partnership Project; Technical Specification Group Services and Systems Aspects; Combinied Circuit Switched (CS) and IP Multimedia Subsystem (IMS) sessions; Stage 1 (Release 7).
3GPP TS 23.279 V7.6.0 (Mar. 2007); Technical Specification; 3rd Generation Partnership Project; Technical Specification Group Services and System Aspects; Combining Circuit Switched (CS) and IP Multimedia Subsystem (IMS) services; Stage 2 (Release 7).
3GPP TS 24.279 V7.5.0 (Jun. 2007); Technical Specification; 3rd Generation Partnership Project; Technical Specification Group Core Network and Terminals; Combining Circuit Switched (CS) and IP Multimedia Subsystem (IMS) services; Stage 3 (Release 7).
J. Rosenberg et al.; RFC3840.txt; Network Working Group, Request for Comments: 3840; Category: Standard Tracks; Indicating User Agent Capabilities in the Session Initiation Protocol (SIP).

(Continued)

*Primary Examiner* — Luat Phung
(74) *Attorney, Agent, or Firm* — Schwabe, Williamson & Wyatt, P.C.

(57) ABSTRACT

A method for establishing a communication connection includes transmitting an identification for identifying a first communication device to the first communication device or a second communication device via a packet-switched first communication connection between the first communication device and the second communication devices, and using the identification to establish a circuit-switched second communication connection between the first communication device and the second communication device.

10 Claims, 5 Drawing Sheets

(56) References Cited

OTHER PUBLICATIONS

3GPP TS 22.081 V3.0.1 (Oct. 1999); Technical Specification; 3rd Generation Partnership Project; Technical Specification Group Services and System Aspects; Line identificationi Supplementary Services; Stage 1 (3G TS 22.081 version 3.0.1).

3GPP TS 22.087 V4.0.0 (Mar. 2001); Technical Specification; 3rd Generation Partnership Project; Technical Specification Group Services and System Aspects; User-to-user Signalling (UUS); Service description—Stage 1 (Release 4).

3G TS 24.087 V3.0.0 (May 1999); Technical Specification; 3rd Generation Partnership Project; Technical Specification Group Core Network; User-to-User Signalling (UUS) Supplementary Service—Stage 3 (3G TS 24.087 version 3.0.0).

3GPP TS 24.247 V6.8.0 (Mar. 2007); Technical Specification; 3rd Generation Partnership Project; Technical Specification Group Core Network and Terminals; Messaging service using the IP Multimedia (IM) Core Network (CN) subsystem; Stage 3 (Release 6).

H. Schulzrinne; rfc3966.txt; Network Working Group; Request for Comments: 3966; Obsoletes: 2806; Category: Standards Track; "The tel URI for Telephone Numbers".

3GPP TS 24.081 V6.0.0 (Dec. 2004); Technical Specification; 3rd Generation Partnership Project; Technical Specification Group Core Network; Line Identification Supplementary Services—Stage 3 (Release 6).

3GPP TS 24.228 V5.12.0 (Mar. 2005); Technical Specification; 3rd Generation Partnership Project; Technical Specification Group Core Network; Signalling flows for the IP multimedia call control based on Session Initiation Protocol (SIP) and Session Description Protocol (SDP); Stage 3 (Release 5).

3GPP TS 24.229 V5.11.1 (Jan. 2005); Technical Specification; 3rd Generation Partnership Project; Technical Specification Group Core Network; IP Multimedia Call Control Protocol based on Session Initiation Protocol (SIP) and Session Description Protocol (SDP); Stage 3 (Release 5).

3GPP TS 24.008 V3.19.0 (Jun. 2004); Technical Specification; 3rd Generation Partnership Project; Technical Specification Group Core Network; Mobile radio interface layer 3 specification; Core Network Protocols; Stage 3 (Release 1999).

\* cited by examiner

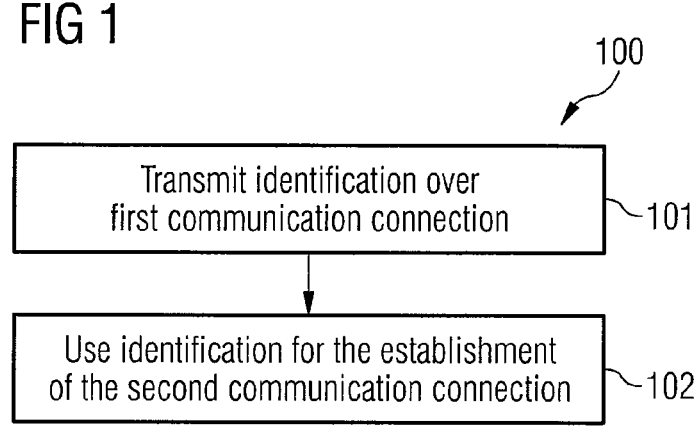
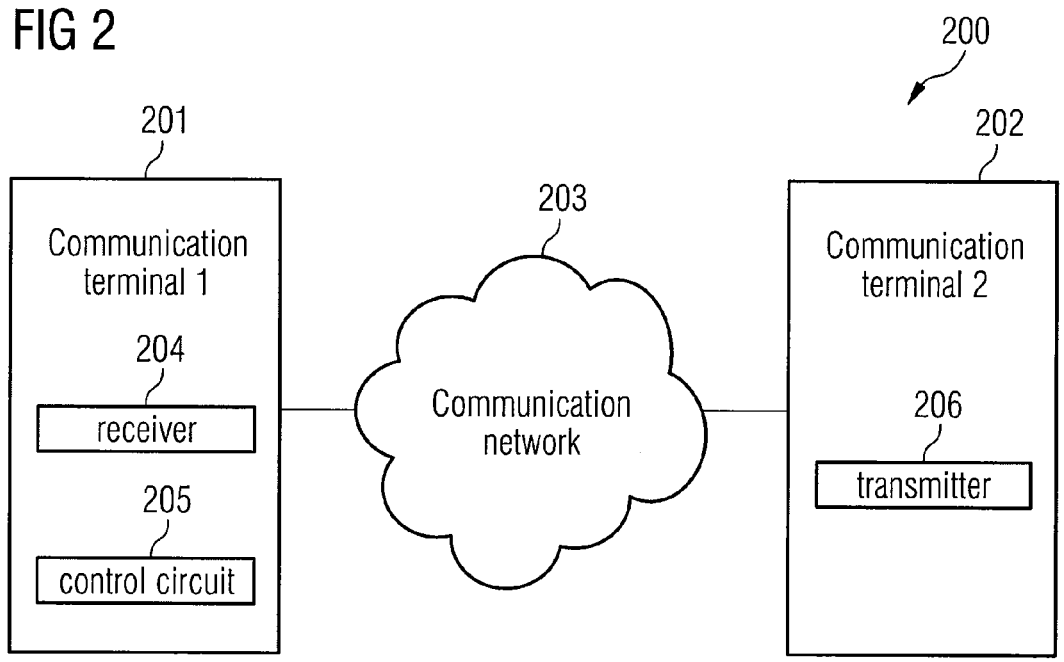

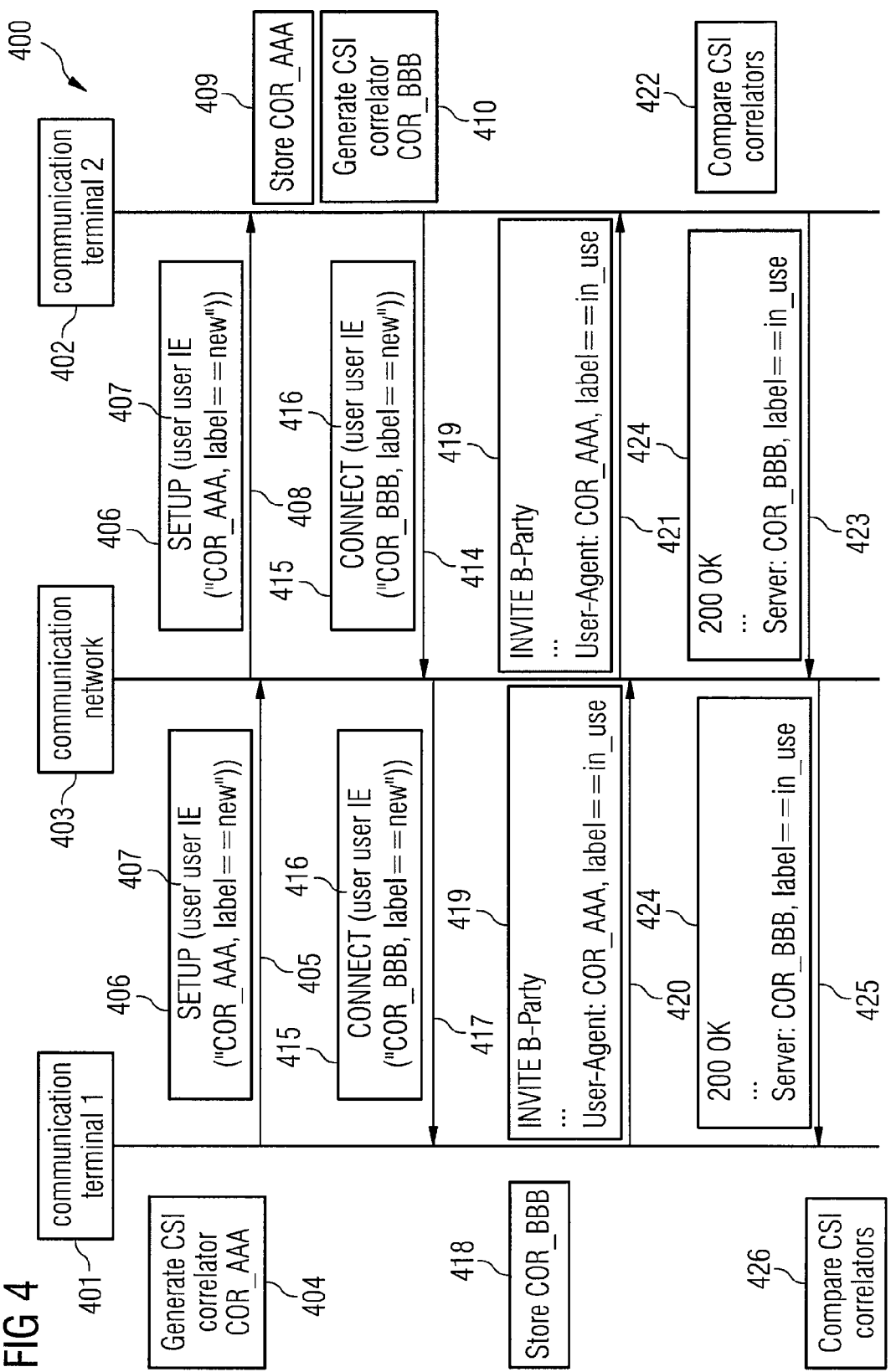

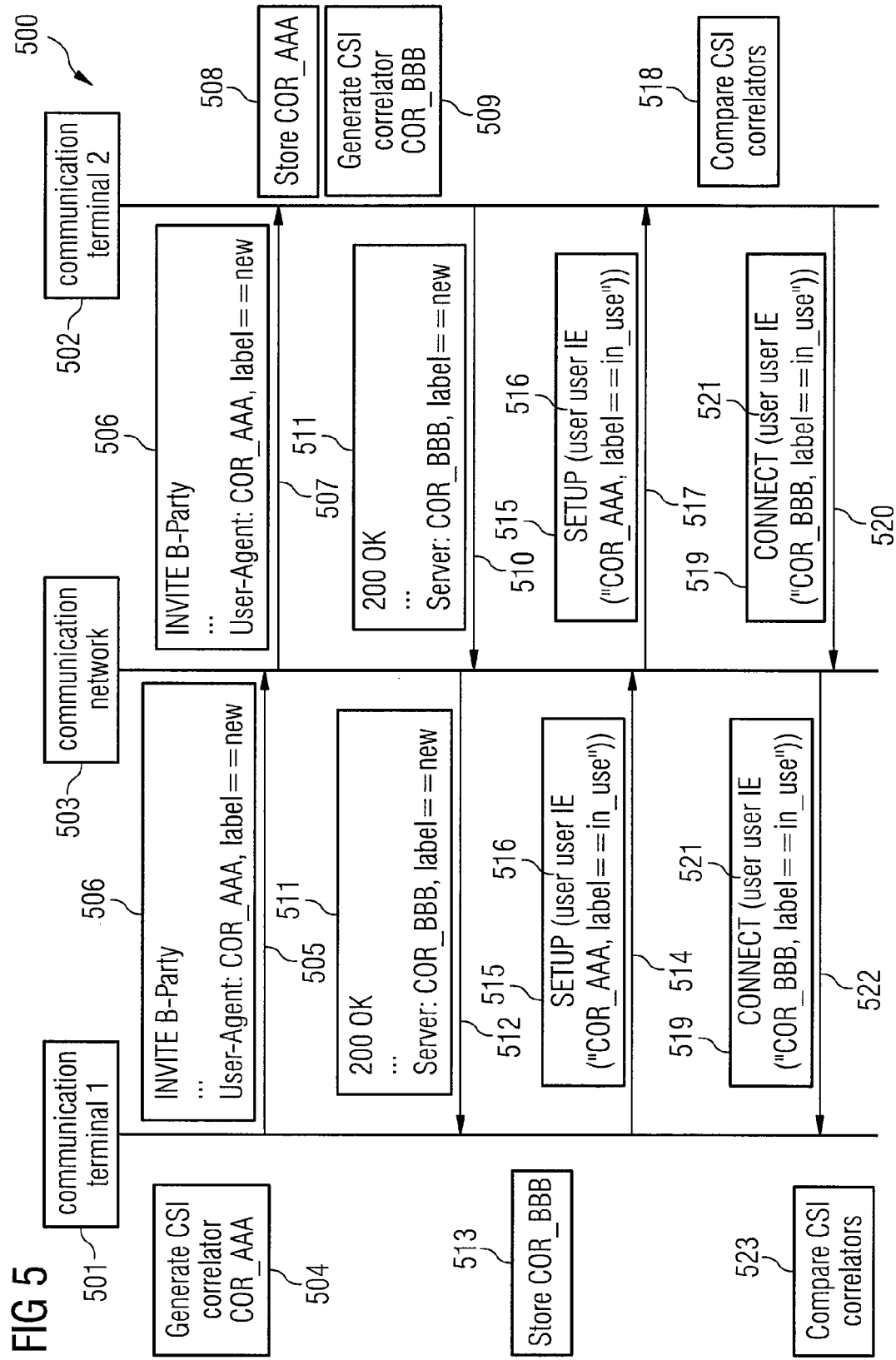

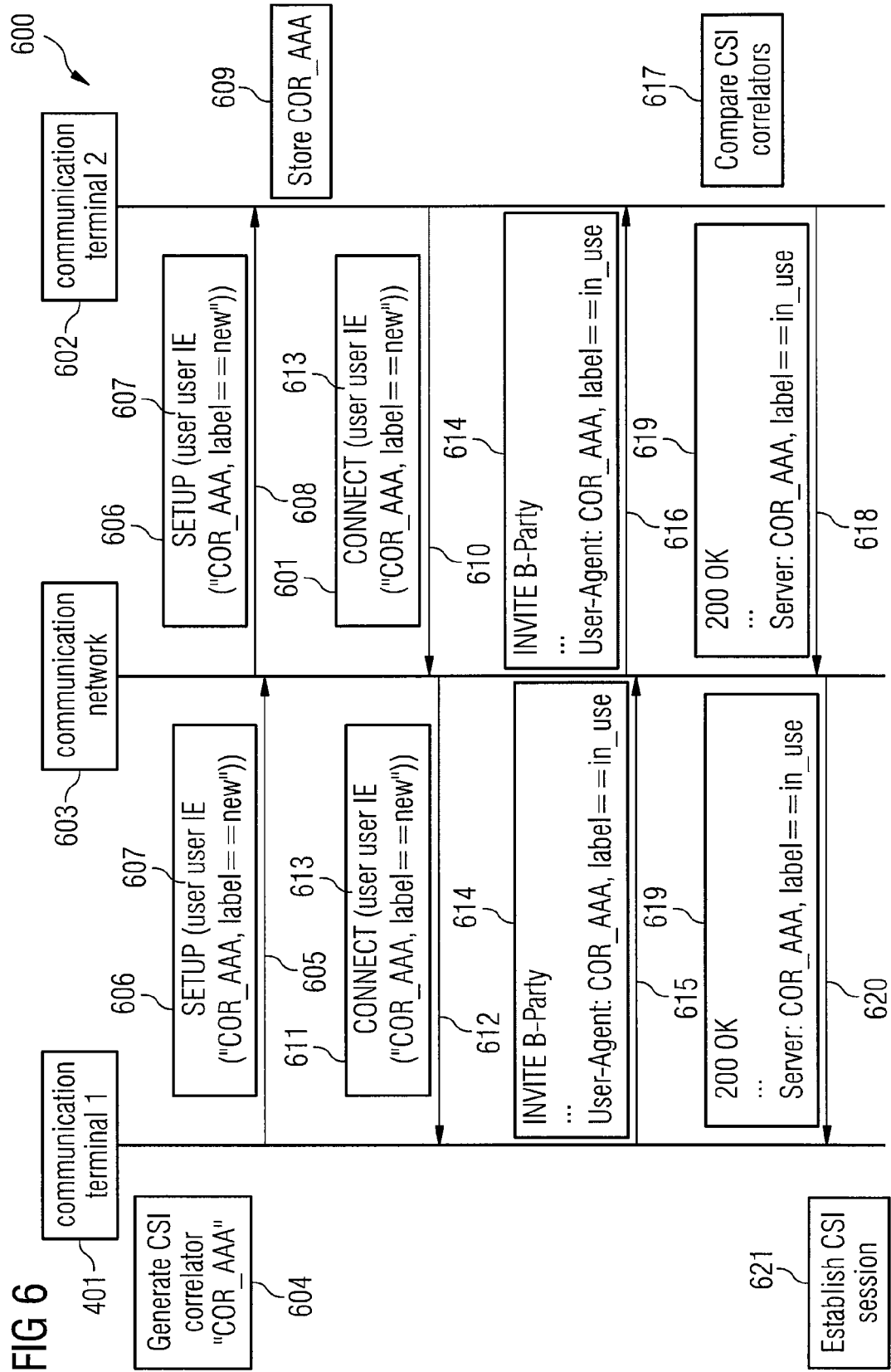

METHOD FOR ESTABLISHING A COMMUNICATION CONNECTION AND COMMUNICATION DEVICE

BACKGROUND

Embodiments of the invention relate generally to methods and systems for establishing a communication connection and communication devices.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a flow diagram according to an embodiment of the invention;

FIG. 2 shows a communication system according to an embodiment of the invention;

FIG. 4 shows a message flow diagram according to an embodiment of the invention;

FIG. 5 shows a message flow diagram according to an embodiment of the invention; and FIG. 6 shows a message flow diagram according to an embodiment of the invention.

DESCRIPTION

Figure 3:
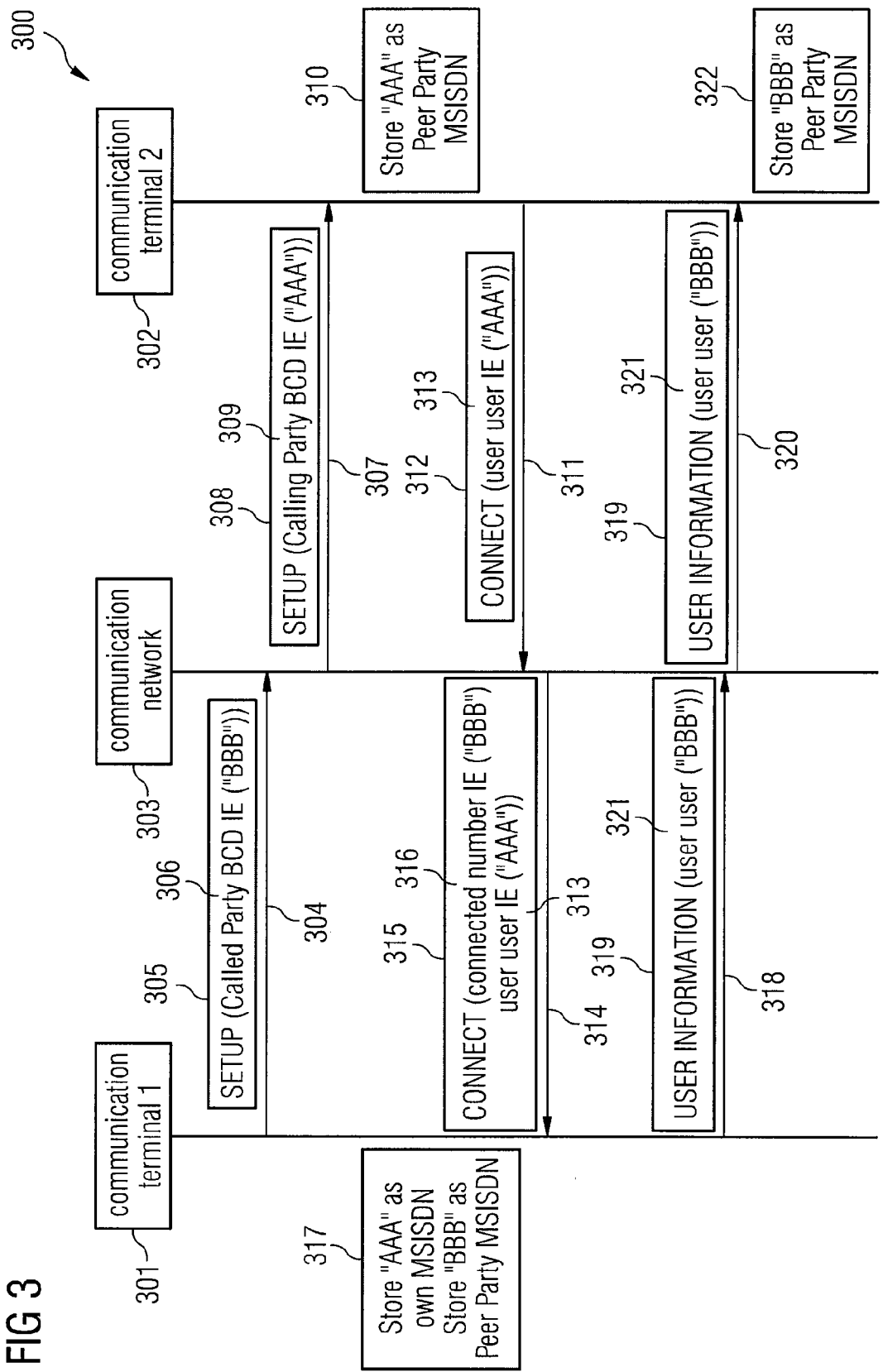
FIG. 3 shows a message flow diagram according to an embodiment of the invention.

FIG. 1 shows a flow diagram 100 according to an embodiment of the invention.

The flow diagram illustrates a method for establishing a communication connection according to one embodiment of the invention.

In 101, an identification for identifying a first communication device is transmitted to the first communication device or a second communication device via a packet-switched first communication connection between the first communication device and the second communication device In the 102, the identification is used to establish a circuit-switched second communication connection between the first communication device and the second communication device.

In another embodiment, the first communication connection is a circuit-switched communication connection and the second communication connection is a packet-switched communication connections. The method illustrated in FIG. 1 may be carried out analogously in this case.

Illustratively, an identification is transmitted via a first communication connection according to a first switching technology (circuit-switched or packet-switched) which may then be used for the establishment of a second communication connection according to a different second switching technology. The identification may be transmitted in course of the active phase of the first communication connection, i.e. when the first communication connection has been successfully established or also in course of the setup phase of the first communication connection, i.e. with a setup message for setting up the first communication connection.

Examples of embodiments are described in the following. They are described referring to the case that the first communication connection is packet-switched and the second communication connection is circuit-switched but are analogously valid for the case that the first communication connection is circuit-switched and the second communication connection is packet-switched.

In one embodiment, the identification is signalled by the first communication device to the second communication device to identify the first communication device as participant of the packet-switched first communication connection between the first and second communication device. For example, the identification is signalled by the first communication device to the second communication device in course of the establishment of the circuit-switched second communication connection. The identification is for example signalled by the first communication device to the second communication device with a request for the establishment of the circuit-switched second communication connection. It may be further signaled in course of the establishment of the circuit-switched second communication connection that the identification identifies a participant of an already established packet-switched communication connection.

In one embodiment, the identification is used by the second communication device to identify the first communication device as participant of the packet-switched first communication connection. For example, the second communication device compares the identification with identifications for identifying communication devices participating in the packet-switched first communication connection. This is for example done in the case that it is signaled to the second communication device, e.g. by a label of the identification, that the identification identifies a participant of an already established packet-switched communication connection.

In one embodiment, the circuit-switched second communication connection is associated with the packet-switched first communication connection. For example, the circuit-switched second communication connection is associated with the packet-switched first communication connection such that the circuit-switched second communication connection and the packet-switched first communication connection form a combinational call/session (also called combinational call or combinational session in the following). The circuit-switched second communication connection is for example associated with the packet-switched first communication connection according to CSI ("Circuit Switched IMS Combinational Service").

The packet-switched first communication connection is for example an IMS (Internet Protocol Multimedia Subsystem) session.

The identification is for example the MSISDN of the first communication device. In this case the MSISDN of the first communication device is for example not derived from the "own MSISDN" locally programmed/stored in the first communication device but is for example transmitted by the second communication device to the first communication device. This means that the second communication device transmits the MSISDN of the first communication device to the first communication device under which the first communication device appears to the second communication device. In this way errors can be avoided which arise from an incorrect "own MSISDN" stored in the first communication device and for example programmed by the user which could be programmed wrongly by the user;

be the wrong MSISDN in the case of multiple MSISDNs of the first communication device or multiple MSISDNs per subscription, for example in the case when for each of a plurality of services an own telephone number is defined or in the case when the services alternate line service or multiple subscriber profile are used; or be different from the MSISDN signalled to the second communication device via CLIP or COLP due to a replacement done by the communication network via which the communication devices communicate. For example, this may occur when a default profile is used and multiple subscriber profile is not supported.

The identification is for example generated by the first communication device or the second communication device.

A circuit can be a hardware circuit, e.g. an integrated circuit, designed for the respective functionality or also a programmable unit, such as a processor, programmed for the respective functionality. A processor may be for example be a RISC (reduced instruction set computer) processor or a CISC (complex instruction set computer).

FIG. 2 shows a communication system 200 according to an embodiment of the invention.

The communication system 200 includes a first communication terminal 201, a second communication terminal 202 and a communication network 203. The communication system 200 is for example a mobile communication system, the first communication terminal 201 and the second communication terminal 202 are for example mobile communication terminals, such as mobile phones, and the communication network 203 is for example a mobile communication network. For example, the communication system 200 is a mobile communication system according to the UMTS (Universal Mobile Telecommunications System) standard as it is specified by the 3GPP (3rd Generation Partnership Project).

The communication system 200 may also be a mobile communication system according to other communication standards, for example according to FOMA (Freedom of Mobile Access), CDMA2000 (CDMA: Code Division Multiple Access), GSM (Global System for Mobile Communications), or EDGE (Enhanced Date Rates for GSM Evolution).

The communication network 203 for example includes a service communication network, for example using a call control protocol such as SIP (Session Initiation Protocol). For example the communication network 203 includes an IMS (Internet Protocol Multimedia Subsystem) which uses SIP as protocol for signalling purposes, for example for call control, e.g. for session invitations.

In the embodiments described in the following, it is assumed that the communication system 200 supports the feature "Circuit Switched IMS Combinational Service" specified by the 3GPP which is also denoted by CSI and means a communication service in which a circuit switched (CS) call, i.e. a circuit switched communication connection between two mobile terminals, is linked (or in other words associated) with an IMS (Internet Protocol Multimedia Subsystem) session, or generally a packet switched communication connection, in which the two mobile terminals participate. The CSI communication service is an end-to-end communication service.

When a mobile terminal receives an invitation to an IMS session and the mobile terminal should be provided with the opportunity to determine if it has already a circuit switched communication connection with the originator of the IMS session, i.e. with the mobile terminal that has initiated the IMS session and has sent the invitation to the IMS session, the originator may indicate its own identification used for circuit switched communication connections, such as an MSISDN (Mobile Subscriber ISDN Number), as a part of the setup of the IMS session, for example in the invitation to the IMS session. In the case that the MSISDN is used, it is for example transferred according to the SIP (Session Initiation Protocol) in the form of a tel URI (URI: Uniform Resource Indicator). Thus, the tel URI in this case corresponds to the MSISDN of the mobile terminal, that initiates the IMS session. In this specification, the term mobile terminal refers to a mobile terminal which, depending on the type of mobile communication network, includes a subscriber module such as a SIM or a USIM. This means that in this specification, mobile terminal may also refer to what is sometimes referred to as mobile station (MS) or, in case of UMTS, as user equipment (UE), i.e. a mobile terminal together with a subscriber module.

The called IMS party, i.e. the mobile terminal that has received the IMS session invitation, may now compare the MSISDN indicated as a part of the IMS session setup with the MSISDN of each mobile terminal to which it has a circuit switched communication connection. An IMS session between two mobile terminals that already have a circuit switched communication connection may be set up by each of the mobile terminals. It is not relevant which of the mobile terminals has initiated the circuit switched communication connection.

Also, it is possible to set up CSI between two mobile terminals, i.e. to establish a packet switched communication connection in parallel to a circuit switched communication connection between two mobile terminals, if the circuit switched communication connection is set up first ("CS first") as well as if the packet switched communication connection is set up first ("IMS first").

In the procedure described above where the originator of the IMS session provides its own MSISDN, or generally its identification under/with which he is addressable for circuit switched communication connections, e.g. its identification used in CS domain of the communication system 200, it is necessary that the initiator, i.e. the mobile terminal initiating the IMS session, knows its own MSISDN. However, scenarios exist in which a mobile terminal does not know its own MSISDN. A mobile terminal may include a SIM (subscriber identity module), a USIM (universal subscriber identity module), a similar chip card or non-volatile memory that provides memory in which the MSISDN of the mobile terminal can be stored. Depending on the preferences of the operator of the communication system the subscriber, i.e. the user of the mobile terminal, may be allowed to change the MSISDN stored and the MSISDN may therefore be incorrect. Further, more than one MSISDN may be stored and the problem rises that it may be uncertain which one was used by the network for establishing a circuit switched communication connection to another mobile terminal to which an IMS session should now be established.

Further, according to some features of mobile communications systems, for example according to the features "Multiple Subscriber Profile", and "Alternate Line Service" according to 3GPP it is possible to assign more than one MSISDN to one mobile station (or to one subscription) between which the mobile terminal may switch dynamically from communication connection to communication connection. Further, in case of Multiple Subscriber Profile (MSP)

the MSISDN which is indicated by the network to the other party (i.e. to the mobile terminal to which a communication connection should be established) when the mobile terminal initiates a communication connection is influenced by the pre-configuration of the default profile (i.e. a default MSISDN may be used) in the mobile communication network for the case that the mobile terminal is using a mobile communication network that does not support MSP and the mobile terminal may register a profile using USSD (Unstructured Supplementary Service Data) signalling to be used if the mobile terminal does not explicitly select a profile (and thus, no MSISDN) when initiating a communication connection. In such a case the mobile terminal may not be able to determine the MSISDN which is indicated by the mobile communication network to another mobile terminal when the mobile terminal establishes a circuit switched communication connection to the other mobile terminal. The MSISDN of the mobile terminal is for example indicated to the other mobile terminal via CLIP/COLP but as explained it may not be known to the mobile terminal itself.

Below, embodiments are described in which it is not necessary for a mobile terminal initiating an IMS session in parallel to a circuit switched communication connection to know its own MSISDN (or generally its own identification used for circuit switched communication connections, e.g. in a CS domain of the communication system 200).

According to embodiments of the invention the first communication device 201 (and similarly the second communication device 202) may include a receiver 204 configured to receive an identification for identifying the first communication device 201 or the second communication device 202 via a circuit-switched first communication connection between the communication device and the other communication device and a control circuit 205 using the identification to establish a packet-switched second communication connection between the communication device and the second communication device 202.

Further, according to embodiments of the invention, the second communication device 202 (and similarly the first communication device 201) may include a transmitter 206 sending an identification of the first communication device 201 or the second communication device 202 via a packet-switched first communication connection between the second communication device 202 and the first communication device 201 to be used for establishing a circuit-switched second communication connection between the first communication device 201 and the second communication device 202.

Which of the communication devices 201, 202 is identified by the identification and which receives the identification or transmits the identification may differ in the various embodiments of the invention and may for example depend on which communication device 201, 202 initiates the first communication connection and/or the second communication connection.

As described above, the case is also possible that the first communication connection is circuit-switched and the second communication connection is packet-switched. An example for this scenario is explained in the following.

FIG. 3 shows a message flow diagram 300 according to an embodiment of the invention.

The message flow takes place between a first communication terminal 301, a second communication terminal 302, and a communication network 303 as they have been explained with reference to FIG. 2.

In this example, it is assumed that the first communication terminal 301 at first establishes a circuit switched communication connection to the second communication terminal 302. After that, the first communication terminal 301 initiates an IMS session with the second communication terminal 302. In order to allow the first communication terminal 301 to signal its own identification within the establishment of the IMS session in order to refer to the used for circuit switched communication connections, in this example an MSISDN, the second communication terminal 302 signals the MSISDN of the first communication terminal 301 to the first communication terminal 301 via a user-to-user data exchange during the establishment phase of the circuit switched communication connection as will be explained in the following. Note that the MSISDN of the first communication terminal 301 may not only be signaled by the first communication terminal 301 in course of the IMS session setup signaling but also for example by a capability query message sent to the second communication terminal 302.

In 304, the first communication terminal 301 sends a first setup message 305 to the communication network 303 to be forwarded to the second communication terminal 302. The first setup message 305 includes a first information element 306 specifying the identification of the second communication terminal 302 for circuit switched communication connections, in this example the MSISDN of the second communication terminal 302.

The communication network 303 forwards the first setup message 305 in 307 to the second communication terminal 302 in the form of a second setup message 308. The second setup message 308 (optionally) includes a second information element 309 inserted by the communication network 303 specifying the MSISDN of the calling party, i.e. the MSISDN of the first communication terminal 301.

In 310, the second communication terminal 302 stores the MSISDN of the first communication terminal 301 as "Peer Party MSISDN".

In 311, the second communication terminal 302 responds to the second setup message 308 by a first connect message 312 which it sends to the communication network 303 to be forwarded to the first communication terminal 301. The first connect message 312 includes a third information element 313 which is a user-user information element of the first connect message 312 and specifies the MSISDN of the first communication terminal 301 as it has been signaled by the second setup message 308.

The first connect message 312 is forwarded by the communication network 303 in the form of a second connect message 315 that includes the third information element 313 and may also include a fourth information element 316 which is a connected number information element specifying the MSISDN of the second communication terminal 302.

By transmitting the third information element 313 to the first communication terminal 301 the first communication terminal 301 is communicated its own MSISDN under which it appears to the second communication terminal 302 in the established circuit switched communication connection. In this way, the MSISDN of the calling party, i.e. the first communication terminal 301, is mirrored back to the first communication terminal 301.

In 317, the first communication terminal 301 stores its own MSISDN and stores the MSISDN of the second communication terminal 302 as indicated in the fourth information element 316.

The first communication terminal 301 now knows its own MSISDN and can use this MSISDN to identify itself when initiating an IMS session with the second communication terminal 302. To also give the second communication terminal 302 this opportunity, the first communication terminal 301 in 318 sends a user information message 319 to the communication network 303 which is forwarded in 320 to the second communication terminal 302 by the communication network 303. The (call control) user information message 319 includes a fourth information element 321 specifying the MSISDN of the second communication terminal 302 in the form of user-to user information. In 322, the second communication terminal 302 stores its own MSISDN for example to be used for initiating an IMS session with the first communication terminal 301. The MSISDN of the first communication terminal 301 has been transferred to the first communication terminal 301 during the setup phase of the circuit switched communication connection and the MSISDN of the second communication terminal 302 has been transferred to the second communication terminal 302 during the active phase of the circuit switched communication connection. Note that the MSISDN of the second communication connection 302 is for example signaled to the first communication terminal 301 in the fourth information element 316 as a COLP feature.

In addition to the message flow described with reference to FIG. 3 or as an alternative, the calling party, i.e. the first communication terminal 301, or the called/connected party, i.e. the second communication terminal 302, can provide the peer MSISDN, i.e. the MSISDN of the respective other communication terminal 301, 302, via SIP signaling. For this purpose, a SIP message may be used or the CSI specific capability query/exchange that uses the SIP options request may be extended to transfer an MSISDN. An MSISDN can be transported by using a SIP user agent header, i.e. the user agent header field in a SIP message, or a SIP server header, i.e. the server header field in a SIP message. In addition, a SIP accept-contact header can be used for transmitting an MSISDN. Furthermore, the remote MSISDN can simply be used as the destination address of a SIP request. In this case, for example, a URI parameter may be used to indicate the scenario, e.g. that a CSI session should be established.

In the following, an alternative embodiment of the invention is explained in which per circuit switched communication connection two random reference numbers, which are denoted as CSI correlators, are exchanged between the peer parties, i.e. the communication terminals, to be used by the communication terminals to identify themselves as participants of the circuit switched communication connection when initiating an IMS session between the communication terminals. This means that the CSI correlators may be exchanged during the setup of an IMS session, i.e. during IMS session setup signaling, such that the initiated IMS session may be associated with the circuit switched communication connection.

When a communication terminal generates a CSI correlator and signals it to another communication terminal for later reference, it labels the CSI correlator as new. When a communication terminal signals a CSI correlator in a request for a communication connection to refer to an already established communication connection for a combined call/session, the communication terminal labels the CSI correlator as in use. This means that each CSI correlator may have a label that is set to "new" or "in use".

FIG. 4 shows a message flow diagram 400 according to an embodiment of the invention.

The message flow takes place between a first communication terminal 401, a second communication terminal 402, and a communication network 403 as explained with reference to FIG. 2.

As above, it is assumed that the first communication terminal 401 initiates the establishment of a circuit switched communication connection between the first communication terminal 401 and the second communication terminal 402. In 404, the first communication terminal 401 generates a first CSI correlator (its own CSI correlator) which may be used for setting up a combinational call/session, i.e. a packet switched communication connection in parallel to a circuit switched communication connection, between the first communication terminal 401 and the second communication terminal 402, e.g. according to CSI.

In 405, the first communication terminal 401 sends a setup message 406 to the communication network 403 to be forwarded to the second communication terminal 402. The setup message 406 includes a first information element 407 specifying the first CSI correlator with label set to "new". In 408, the communication network 403 forwards the setup message 406 to the second communication terminal 402.

The second communication terminal 402 then checks whether the received first CSI correlator has already been stored in the second communication terminal 402. If the received first CSI correlator has been stored in the second communication terminal 402, it rejects the received first CSI correlator for example by sending an error message to the first communication terminal 401. For the following it is assumed that the received first CSI correlator has not been stored in the second communication terminal 402. In 409, the second communication terminal 402 stores the first CSI correlator included in the first (user) information element 407 such that it may compare the first CSI correlator with CSI correlators specified in incoming invitations to IMS sessions (or with CSI correlators associated with IMS sessions in which the second communication terminal 402 already participates, in a scenario where there are such IMS sessions. In this example, however, it is assumed that the second communication terminal 402 does not participate in an IMS session with which the first CSI correlator is associated as peer party CSI correlator).

In 410, the second communication terminal 402 generates a second CSI correlator (its own CSI correlator).

In response to the setup message 406, in 411, the second communication terminal 402 sends a connect message 415 to the communication network 403 to be forwarded to the first communication terminal 401. The connect message 415 includes a second (user-user) information element 416 specifying the second CSI correlator with label set to "new". In 417, the communication network 403 forwards the connect message 415 to the first communication terminal 401. The first communication terminal 401 then checks whether the received second CSI correlator has already been stored in the first communication terminal 401. If the received second CSI correlator has been stored in the first communication terminal 401, it rejects the received second CSI correlator for example by sending an error message to the second communication terminal 402. For the following it is assumed that the received second CSI correlator has not been stored in the first communication terminal 401. In 418, the first communication terminal 401 stores the second CSI correlator to be used for matching (i.e. comparing) it with a CSI correlator included in an incoming IMS session invitation (or, in a scenario where the communication terminal 401 is already participating in IMS sessions, for matching it with CSI correlators associated with IMS sessions in which the first communication terminal 401 is already participating). Note that the first CSI correlator may be stored by the first communication terminal 401 itself and similarly, the second CSI correlator may be stored by the second communication terminal 402 itself such that each communication terminal 401, 402 knows its own CSI correlator.

The CSI correlators are for example combinational call/session specific and are for example randomly chosen and newly generated every time a combinational call/session should be established. In another embodiment the first CSI correlator and the second CSI correlator are static. In this case, each CSI correlator is chosen such that it is unique. This may for example be achieved by using the IMEI (International Mobile Station Equipment Identifier) for this purpose.

It is now assumed that the first communication terminal 401 is going to establish an IMS session in parallel to the circuit switched communication connection between the first communication terminal 401 and the second communication terminal 402 according to CSI. For this, the first communication terminal 401 sends an invite message 419 (according to SIP) to the communication network 403 to be forwarded to the second communication terminal 402 in 420. The invite message 419 includes the first CSI correlator, i.e. the CSI correlator of the first communication terminal 401 itself, with label set to "in use". In this example the first CSI correlator is specified in the user agent header field of the SIP invite message 419.

In 421, the invite message 419 is forwarded to the second communication terminal 402.

In 422, the second communication terminal 402, in order to decide whether the incoming IMS connection, i.e. the invitation to an IMS session according to the invite message 419, is originated by a communication terminal to which a circuit switched communication connection is already established, the second communication terminal 402 checks whether the CSI correlator received in the invite message 419 is labeled as in use.

If the CSI correlator received in the invite message 419 is not labeled as in use, but as new, the second communication terminal 402 checks whether the received CSI correlator has already been stored in the second communication terminal 402. If the received CSI correlator has already been stored in the second communication terminal 402, it rejects the received CSI correlator for example by sending an error message to the first communication terminal 401. If the received CSI correlator has not been stored in the second communication terminal 402, it stores the CSI correlator specified in the invite message 419 similar to the storage of the CSI correlator received with the setup message 406 (this could then be the beginning of a "PS first" scenario.)

Since in this example, the CSI correlator is labeled as in use, the second communication terminal 402 compares the CSI correlator received in the invite message 419 with the CSI correlator received by the setup message 406 and stored in 409.

Since in this example, the two CSI correlators match, the second communication terminal 402 in 423 sends a 200 OK message 424 including its own CSI correlator, i.e. the second CSI correlator, with label set to "in use". In this example, the second CSI correlator is specified in the server header field of the SIP 200 OK message 424. In 425, the 200 OK message 424 is forwarded by the communication network 403 to the first communication terminal 401. The second CSI correlator included in the 200 OK message 424 is stored by the first communication terminal 401 and is compared, in 426, to CSI correlators associated with communication terminals to which a circuit switched communication connection is established, in this case to the second CSI correlator of the second communication terminal 402 which was received with the connect message 415. Since in this example, the CSI correlators compared match, the IMS session may be associated with the circuit switched communication connection and the combinational call is successfully set up. If there would have been no match, the setup of the combinational call would have failed. Error handling could have been started in this case.

A combinational call, i.e. a CSI session, may also be established by at first establishing an IMS session and then establishing a circuit switched communication connection which is then associated with the IMS session. If, for example, there is no circuit switched communication connection between the first communication terminal 401 and the second communication terminal 402 when the invite message 419 is sent to the second communication terminal 402, the CSI correlator sent with the invite message 419 would be labeled as new and the second communication terminal 402 would know that the IMS session to be established should not be combined with an already existing circuit-switched communication connection.

When no circuit switched communication connection between the first communication terminal 401 and the second communication terminal 402 has been established before the transmission of the invite message 419, and consequently, the first CSI correlator included in the invite message 419 is labeled as new, the second communication terminal 402, in 422, stores the first CSI correlator included in the invite message 419, associates it with the IMS session to which the second communication terminal 402 is invited by the invite message 419 and may use it to determine whether a circuit switched communication connection to be established should be combined with the IMS session. This is described in more detail with reference to FIG. 5.

FIG. 5 shows a message flow diagram 500 according to an embodiment of the invention.

The message flow takes place between a first communication terminal 501, a second communication terminal 502, and a communication network 503 as explained with reference to FIG. 2.

In this embodiment, it is assumed that the first communication terminal 501 is going (e.g. according to an input of the user) to establish an IMS session between the first communication terminal 501 and a second communication terminal 502 before a circuit switched communication connection has been established between the first communication terminal 501 and the second communication terminal 502.

In 504, the first communication terminal 501 generates a first CSI correlator (its own CSI correlator) and stores it. In 505, to establish an IMS session with the second communication terminal 502, the first communication terminal 501 sends an invite message 506 to be forwarded by the communication network 503 to the second communication terminal 502. The invite message 506 includes an indication of the first CSI correlator labeled as new. In 507, the invite message 506 is forwarded to the second communication terminal 502. The second communication terminal 502 then checks whether the received first CSI correlator has already been stored in the second communication terminal 502. If the received first CSI correlator has been stored in the second communication terminal 502, it rejects the received first CSI correlator for example by sending an error message to the first communication terminal 501. For the following it is assumed that the received first CSI correlator has not been stored in the second communication terminal 502. Analogously to steps 409 and 410 described with reference to FIG. 4, the second communication terminal 502 stores the first CSI correlator and generates a second CSI correlator in 508 and 509 wherein the first CSI correlator is stored in 508 such that it may be compared to CSI correlators included in setup messages for setting up circuit switched communication connections and can thus be used to determine whether the IMS session with the first communication terminal 501 should be combined with a requested circuit switched communication connection.

Note that in 508, the first CSI correlator included in the invite message 506 is not compared to CSI correlators associated with circuit switched communication connections that the second communication terminal 502 has, since it is labeled as new, not as in use.

In 510, the second communication terminal 502 sends a 200 OK message 511 to the communication network 503 to be forwarded to the first communication terminal 501. The 200 OK message 511 indicates that the second communication terminal 502 agrees to the IMS session to which it has been invited in accordance with the invite message 506 and includes the second CSI correlator labeled as new.

In 512, the 200 OK message 511 is forwarded by the communication network 503 to the first communication terminal 501. The first communication terminal 501 then checks whether the received second CSI correlator has already been stored in the first communication terminal 501. If the received second CSI correlator has been stored in the first communication terminal 501, it rejects the received second CSI correlator for example by sending an error message to the second communication terminal 502. For the following it is assumed that the received second CSI correlator has not been stored in the first communication terminal 501. In 513, the first communication terminal 501 stores the second CSI correlator such that it may be compared to CSI correlators included in setup messages for setting up circuit switched communication connections and can thus be used to determine whether a requested circuit switched communication connection should be combined with the IMS session that is established.

It is assumed that now the first communication terminal 501, e.g. in accordance with an input of the user of the first communication terminal 501, is going to establish a combinational session according to CSI from the IMS session established between the first communication terminal 501 and the second communication terminal 502. For this, in 514, it sends a setup message 515 to the communication network 503 to be forwarded to the second communication terminal 502. The setup message 515 includes a first (user-user) information element 516 specifying the first CSI correlator with label set to "in use".

In 517, the setup message 515 is forwarded to the second communication terminal 502. In 518, the second communication terminal 502 notes that the first CSI correlator in the setup message 515 is labeled as "in use" and compares it with the CSI correlators it has stored that are associated with an IMS session in which the second communication terminal 502 participates. Since in this example, the first CSI correlator is also the CSI correlator that has been transmitted to the second communication terminal 502 in the invite message 506 there is a match and the second communication terminal 502 associates the requested circuit switched communication connection with the IMS session between the first communication terminal 501 and the second communication terminal 502.

If the first CSI correlator would have been labeled as "new", the second communication terminal 502 would check whether the received first CSI correlator has already been stored in the second communication terminal 502. If the received first CSI correlator has already been stored in the second communication terminal 502, it would reject the received first CSI correlator for example by sending an error message to the first communication terminal 501. If the received first CSI correlator has not been stored in the second communication terminal 502, the first CSI correlator would be stored similar to 409 in FIG. 4 and similar to 410 in FIG. 4, a third CSI correlator would be generated and would be sent to the first communication terminal 501 with a connect message.

In this case, since the first CSI correlator has been labeled in use and there is a match, the second communication terminal 502 sends a connect message 519 in 520 to the communication network 503 to be forwarded to the first communication terminal 501.

The connect message 519 acknowledges the setup of the circuit switched communication connection and includes a second information element 521 specifying the second CSI correlator in 522 labeled as in use. The connect message 519 is forwarded to the first communication terminal 501 by the communication network 503 in 522, and in 523, similar to 426, the second CSI correlator is stored as peer party CSI correlator and, since it is labeled as in use, compared with CSI correlators associated with IMS sessions in which the first communication terminal 501 participates. The combinational communication connection is set up with the IMS session associated with the second CSI correlator.

A CSI correlator may be transmitted using a SIP message such as the invite message 506 or the 200 OK message 511 by including it into the user agent header or the server header. In other embodiments, one or more other SIP headers or one or more other SIP parameters can be used or are extended to transmit CSI correlators.

Thus in the CS first scenario, i.e. the circuit switched communication connection is established before the packet switched communication connection, as well as in the IMS first scenario, i.e. the packet switched communication connection is established before the circuit switched communication connection, in some embodiments, such as the ones described with reference to FIG. 4 and FIG. 5, the CSI correlators are generated, exchanged, stored and matched with CSI correlators that are already in use, i.e. associated with communication connections already established. As long as a communication connection is active, the same CSI correlator, namely the one associated with the communication connection, is used in outgoing CSI requests to the same remote party if it is decided that a combinational call/session according to CSI should be established. A CSI correlator received from a remote party labeled as in use is matched against all currently valid remote CSI correlators, i.e. all CSI correlators associated with existing communication connections. The respective circuit switched communication connection and the IMS session, or more generally the packet switched communication connection, are regarded as a combinational call/session, i.e. they are logically associated to each other, for example in accordance to CSI as specified by the 3GPP. The local and remote CSI correlators are erased if the corresponding circuit switched communication connection and the corresponding packet switched communication connection is terminated. This means that a CSI correlator is removed from memory if the communication connection with which it is associated is terminated.

The CSI correlator can be seen as an identification for identifying the communication device initiating the second communication connection.

In another embodiment, the received remote CSI correlator is used in outgoing CSI requests. This means that for example in 514, the first information element 516 of the setup message 515 does not specify the first CSI correlator of the first communication terminal 501 but the second CSI correlator of the second communication terminal 502, which is in this case the CSI correlator of the remote party, i.e. the remote CSI correlator received, in this example, with the 200 OK message 511 in 512. Correspondingly, the matching of CSI correlators by the recipient side, in this example the comparison of CSI correlators in 518 by the second communication terminal 502 is done based on the local CSI correlator, i.e. the CSI correlator generated by the recipient site, in this example the second CSI correlator generated in 509 by the second communication terminal 502.

In one embodiment, only one CSI correlator is used instead of two CSI correlators. In this case, only the originating side that initiates the establishment of the first communication connection of the combinational call/session generates a CSI correlator. An example for this and where the first communication connection of the combinational call/session is a circuit switched communication connection, i.e. the circuit switched communication connection is established before the packet switched communication connection, is described in the following with reference to FIG. 6.

FIG. 6 shows a message flow diagram 600 according to an embodiment of the invention.

The message flow takes place between a first communication terminal 601, a second communication terminal 602 and a communication network 603 as described with reference to FIG. 2.

Analogously to 404, 405 and 408 described with reference to FIG. 4, in 604 a CSI correlator is generated by the first communication terminal 601, in 605 a setup message 606 including an information element 607 specifying the CSI correlator labeled as new is sent by the first communication terminal 601 to the communicational network 603 and in 608 it is forwarded to the second communication terminal 602.

Analogously to 409, the CSI correlator generated by the first communication terminal 601 is stored by the second communication terminal 602 in 609.

In this example, it is assumed that there is no IMS session (and no circuit-switched communication connection) between the first communication terminal 601 and the second communication terminal 602 that is associated with the CSI correlator. However, it may also be the case that the packet switched communication connection is established before the circuit switched communication connection between the first communication terminal 601 and the second communication terminal 602. In this case, the CSI correlator would be labeled as in use in the setup message 606 and would match the CSI correlator with the already established IMS session and the circuit switched communication connection would be associated with the IMS session.

In this example, where no IMS session exists between the first communication terminal 601 and the second communication terminal 602 that is associated with the CSI correlator, the second communication terminal 602 responds to the setup request of the first communication terminal 601 for a circuit switched communication connection in 610 with a connect message 611 that is forwarded by the communication network 603 in 612 to the first communication terminal 601.

The connect message 611 may include a second information element 613 that specifies the CSI correlator labeled as new. However, since the CSI correlator is already known to the first communication terminal 601 this is optional.

It is assumed that the first communication terminal 601 is going to establish a combinational call/session from the established circuit switched communication connection, i.e. is going to establish an IMS session in parallel to the established circuit switched communication connection. Therefore, analogously to 420 and 421, the first communication terminal 601 sends an invite message 614 in 615 to the communication network 603 which is forwarded in 616 to the second communication terminal 602. The invite message 614 includes an indication of the CSI correlator labeled as in use.

In 617, analogously to 422, the second communication terminal 602 notes that the CSI correlator received with the invite message 614 is labeled as in use and compares it with CSI correlators already associated with circuit switched communication connections in which the second communication terminals 602 participates. The second communication terminal 602 associates the IMS session initiated by the first communication terminal 601 with the circuit switched communication connection and acknowledges this by transmitting, in 618, a 200 OK message 619 to the communication network 603 which is forwarded to the first communication terminal 601 in 619, analogously to 423 and 425 described with reference to FIG. 4.

In 621, the first communication terminal 601 finishes the establishment of the IMS session and associates it with the circuit switched communication connection.

In this embodiment, only one CSI correlator is generated which is signaled in course of the setup of the first communication connection, i.e. the circuit switched communication connection or the packet switched communication connection depending on the current scenario (IMS first or CS first). If the same CSI correlator is received afterwards (then labeled as in use), depending on the current scenario in course of the setup of a circuit switched communication connection or a packet switched communication connection in addition to the already established communication connection, there is a match and a combinational call/session is established. The mobile terminal initiating the second communication connection inserts the CSI correlator labeled as in use to indicate that the second communication connection, depending on the scenario a circuit switched communication connection established in addition to a packet switched communication connection or a packet switched communication connection established in addition to a circuit switched communication connection, is to be part of a combinational call/session and should therefore be associated to an already ongoing communication connection, i.e. the first communication connection.

This embodiment (as well as the "two correlator variant" described with reference to FIGS. 4 and 5) may be implemented without using the CLIP/COLP supplementary service and therefore without using the MSISDNs of the communication terminals 601, 602. Further, this embodiment may be used in anonymous call/session scenarios, where for example, the MSISDN of a caller, i.e. sender of a setup message, is not signaled. Therefore, the CSI service can even be used in scenarios where anonymous calls/sessions are supported.

In the embodiments described above no user interaction, i.e. user input, is needed and no knowledge of the MSISDN currently used by a mobile terminal is necessary. Further, the probability to set up a combinational call/session by mistake with a party with which it is not desired is very low and collisions can be detected. The label of the CSI correlator allows the detection of collision cases where a first communication terminal and a second communication terminal have chosen the same CSI correlator, e.g. the same random number, and signal it to a third communication terminal. The third communication terminal may check whether a signalled CSI correlator is labeled as in use and indicates that a requested communication connection/session should be combined with an already existing communication connection/session or whether it is labeled as new and thus does not indicate that such a combination is requested.

If, for example, the third communication terminal receives a request from the first communication terminal including a CSI correlator that is labeled as new but has already been signalled by the second communication terminal with label set to "new", and is therefore "in use" with the second communication terminal, the third communication terminal detects that there is a collision and generates an alternative CSI correlator and signals this CSI correlator to the first communication terminal labeled as new. The first communication terminal may then replace the CSI correlator generated by itself (which led to the collision) by the CSI correlator generated by the third communication terminal.

In one embodiment, CSI correlators are always signalled with label either set to "new" or "in use". In another embodiment, CSI correlators are not labeled and a communication terminal that receives a CSI correlator with a request for the establishment of a communication connection/session detects whether this CSI correlator is already associated with an existing communication connection/session. If it is already associated with an existing communication connection/session, the communication connection/session to be established is combined with the existing communication connection/session. If it is not associated with an existing communication connection/session it is associated with the communication connection/session and is stored for later comparison with CSI correlators received in requests for the establishment of communication connections/sessions.

Generally, in one embodiment, a method for establishing a communication connection is provided including transmitting an identification for identifying a first communication device to the first communication device or a second communication device via a first communication connection according to a first switching technology between the first communication device and the second communication device; and using the identification to establish a second communication connection according to a second switching technology that is different from the first switching technology between the first communication device and the second communication device.

A corresponding system is provided according to one embodiment of the invention.

In one embodiment, a system for establishing a communication connection is provided including a transmitting circuit transmitting an identification for identifying a first communication device to the first communication device or a second communication device via a packet-switched first communication connection between the first communication device and the second communication device; and a communication circuit using the identification to establish a circuit-switched second communication connection between the first communication device and the second communication device.

In another embodiment, a system for establishing a communication connection is provided including a transmitting circuit transmitting an identification for identifying a first communication device to the first communication device or a second communication device via a circuit-switched first communication connection between the first communication device and the second communication device; and a communication circuit using the identification to establish a packet-switched second communication connection between the first communication device and the second communication device.

According to one embodiment, a communication device includes a transmitter sending an identification of the communication device or another communication device via a packet-switched first communication connection between the communication device and the other communication device to be used for establishing a circuit-switched second communication connection between the communication device and the other communication device.

According to another embodiment, a communication device includes a transmitter sending an identification of the communication device or another communication device via a circuit-switched first communication connection between the communication device and the other communication device to be used for establishing a packet-switched second communication connection between the communication device and the other communication device.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. One or more non-transitory computer readable media having instructions that, when executed, cause a first communication terminal to:

process a set up message of a circuit-switched (CS) communication connection that is received from a second communication terminal, the setup message to include a first CSI correlator, which is a random reference number, that is associated with the second communication terminal;

determine the first CSI correlator was not previously saved at the first communication terminal;

save the first CSI correlator based on the determination that the first CSI correlator was not previously saved at the first communication terminal;

generate a second CSI correlator, which is another random reference number, that is associated with the first communication terminal; and transmit a connect message, which includes the second CSI correlator, to the second communication terminal, wherein the first or second CSI correlator is to be used to establish an IP multimedia services (IMS) communication connection that is to be maintained in parallel with the CS communication connection and the instructions, when executed, further cause the first communication terminal to:

process an invite message that is to initiate the IMS communication connection between the first and second communication terminals, the invite message to include a third CSI correlator and a label to indicate the third CSI correlator is in use;

determine the third CSI correlator equals the first CSI correlator; and transmit an OK message based on determination the third CSI correlator equals the first CSI correlator to facilitate establishment of the IMS communication connection.

2. The one or more computer-readable media of claim 1, wherein the instructions, when executed, further cause the first communication terminal to:

generate the connect message with an information element that includes a label to indicate the second CSI correlator is new.

3. The one or more computer-readable media of claim 1, wherein the invite message is a session initiation protocol (SIP) message.

4. The one or more computer-readable media of claim 3, wherein the SIP message includes the third CSI correlator in a user agent header field.

5. A first communication terminal comprising a receiver to receive an invite message from a second communication terminal, the invite message to facilitate establishment of an IP multimedia services (IMS) communication connection between the first and second communication terminals and to include a first CSI correlator, which is a random reference number, that is associated with the second communication terminal;

a controller to:
determine the first CSI correlator was not previously saved at the first communication terminal;
save the first CSI correlator based on the determination that the first CSI correlator was not previously saved at the first communication terminal;

generate a second CSI correlator, which is another random reference number, that is associated with the first communication terminal; and a transmitter to transmit an OK message, which includes the second CSI correlator, to the second communication terminal, in response to the invite message, wherein the first or second CSI correlator is to be used to establish a circuit-switched (CS) communication connection that is to be maintained in parallel with the IMS communication connection and the receiver is further to receive a setup message to initiate the CS communication connection between the first and second communication terminals, the setup message to include a third CSI correlator and a label to indicate the third CSI correlator is in use; the controller is further to determine the third CSI correlator equals the first CSI correlator; and the transmitter is further to transmit a connect message based on determination the third CSI correlator equals the first CSI correlator to facilitate establishment of the CS communication connection.

6. The first communication terminal of claim 5, wherein the OK message includes an information element having a label to indicate the second CSI correlator is new.

7. One or more non-transitory computer readable media having instructions that, when executed, cause a first communication terminal to:

process a setup message of a circuit-switched (CS) communication connection that is received from a second communication terminal, the setup message to include a first CSI correlator, which is a random reference number, that is associated with the second communication terminal;

determine the first CSI correlator was not previously saved at the first communication terminal;

save the first CSI correlator based on the determination that the first CSI correlator was not previously saved at the first communication terminal; and transmit a connect message, which includes the first CSI correlator, to the second communication terminal, wherein the first CSI correlator is to be used to establish an IP multimedia services (IMS) connection that is to be maintained in parallel with the CS communication connection and the instructions, when executed, further cause the first communication terminal to:

process an invite message that is to initiate the IMS communication connection between the first and second communication terminals, the invite message to include a second CSI correlator and a label to indicate the second CSI correlator is in use;

determine the second CSI correlator equals the first CSI correlator; and transmit an OK message based on determination the second CSI correlator equals the first CSI correlator to facilitate establishment of the IMS communication connection.

8. The one or more computer-readable media of claim 7, wherein the instructions, when executed, further cause the first communication terminal to:

generate the connect message with an information element that includes a label to indicate the first CSI correlator is new.

9. The one or more computer-readable media of claim 7, wherein the invite message is a session initiation protocol (SIP) message.

10. The one or more computer-readable media of claim 9, wherein the SIP message includes the third CSI correlator in a user agent header field.

\* \* \* \* \*